United States Patent [19]

Kerrigan et al.

[11] Patent Number: 5,035,040
[45] Date of Patent: Jul. 30, 1991

[54] HOG RING FASTENER, TOOL AND METHODS

[75] Inventors: James E. Kerrigan, Des Plaines; John E. McMenamin, Elmhurst, both of Ill.

[73] Assignee: Duo-Fast Corporation, Franklin Park, Ill.

[21] Appl. No.: 641,600

[22] Filed: Feb. 13, 1991

Related U.S. Application Data

[63] Continuation of Ser. No. 358,254, May 30, 1989, abandoned.

[51] Int. Cl.[5] .............................................. B21D 53/52
[52] U.S. Cl. ...................... 29/505; 29/243.56; 59/75; 72/410; 140/82; 140/9; 227/83; 227/411
[58] Field of Search ................. 59/75; 72/410; 140/82, 140/93 D; 227/83, 902; 411/457, 458, 460, 461, 471, 472; 29/243.56, 411, 469.5

[56] References Cited

U.S. PATENT DOCUMENTS

| | | | |
|---|---|---|---|
| 1,104,094 | 7/1914 | Amberg | 411/472 |
| 1,811,060 | 6/1931 | Obstfeld | 59/71 |
| 2,055,257 | 9/1936 | Maynard et al. | 140/55 |
| 2,117,742 | 5/1938 | Polzer | 227/83 |
| 2,128,443 | 8/1938 | Vogel | 59/77 |
| 2,174,152 | 9/1939 | Curtiss | 140/55 |
| 2,678,443 | 5/1954 | Lindstrom | 29/243.56 |
| 2,857,735 | 10/1958 | Mashl | 59/77 |
| 2,921,315 | 1/1960 | Albrecht et al. | |
| 3,640,317 | 2/1972 | Panfili | 59/77 |

FOREIGN PATENT DOCUMENTS 779971 4/1935 France ................. 140/93 D

OTHER PUBLICATIONS

"Kent Klip", fastener and tool, 2 pages of drawing, 8/28/1970.

Primary Examiner—3
Assistant Examiner—David Jones
Attorney, Agent, or Firm—Mason, Kolehmainen, Rathburn & Wyss

[57] ABSTRACT

A hog ring fastener has a straight line base and legs each perpendicular to the base but offset at an angle to each other permitting the use of relatively inexpensive "C" points. A stick of the fasteners is generally channel shaped, with the legs and bases all angularly inclined to the longitudinal axis of the stick. The assembly of fasteners is made in a multiwire process by severing blanks and forming the legs at a bias to a line perpendicular to the wire direction. A tool and method for applying the fastener carries out two different deformation stages, one being a predeformation stage to incline the legs of the fastener inward to a preferred application position.

9 Claims, 13 Drawing Sheets

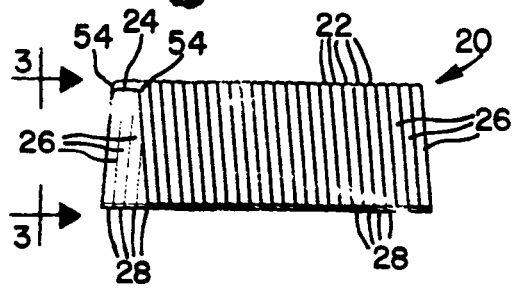
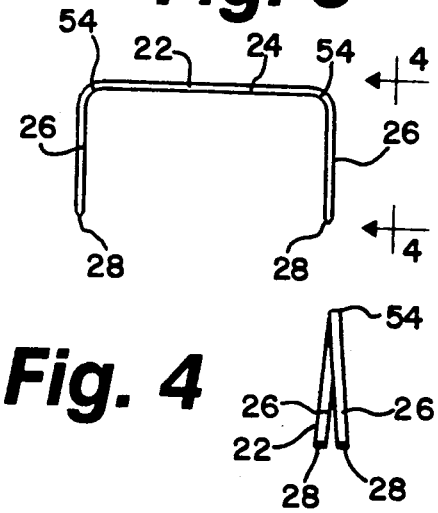
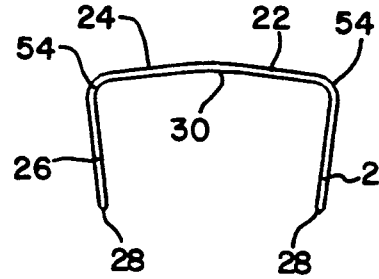
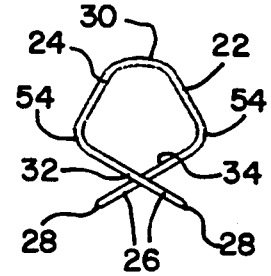
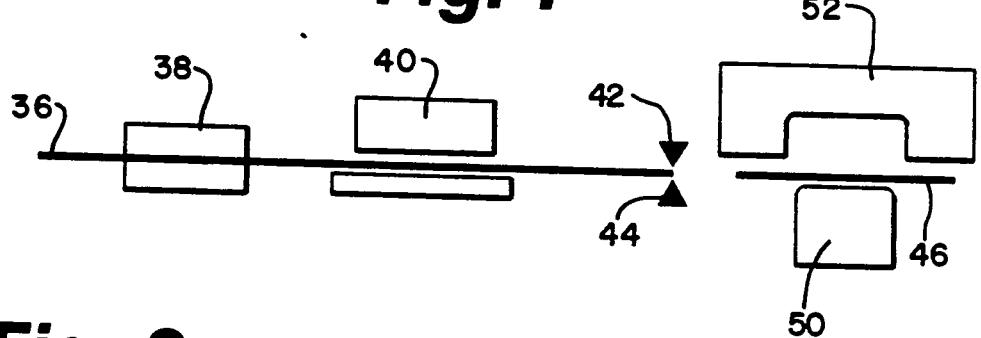
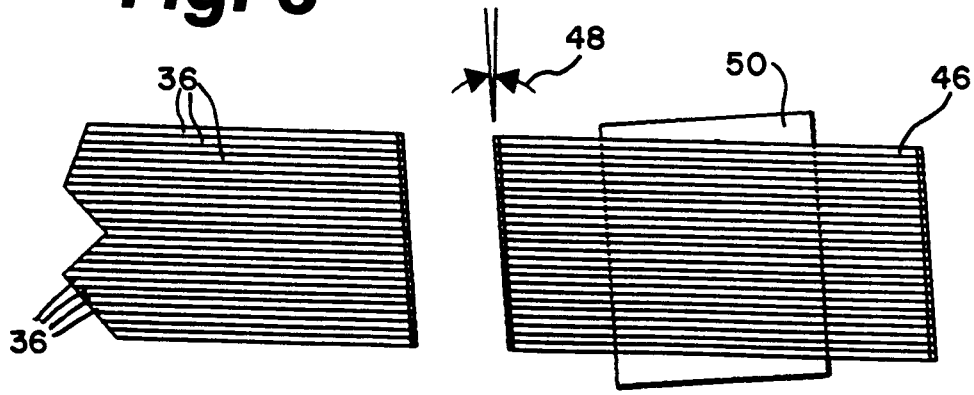

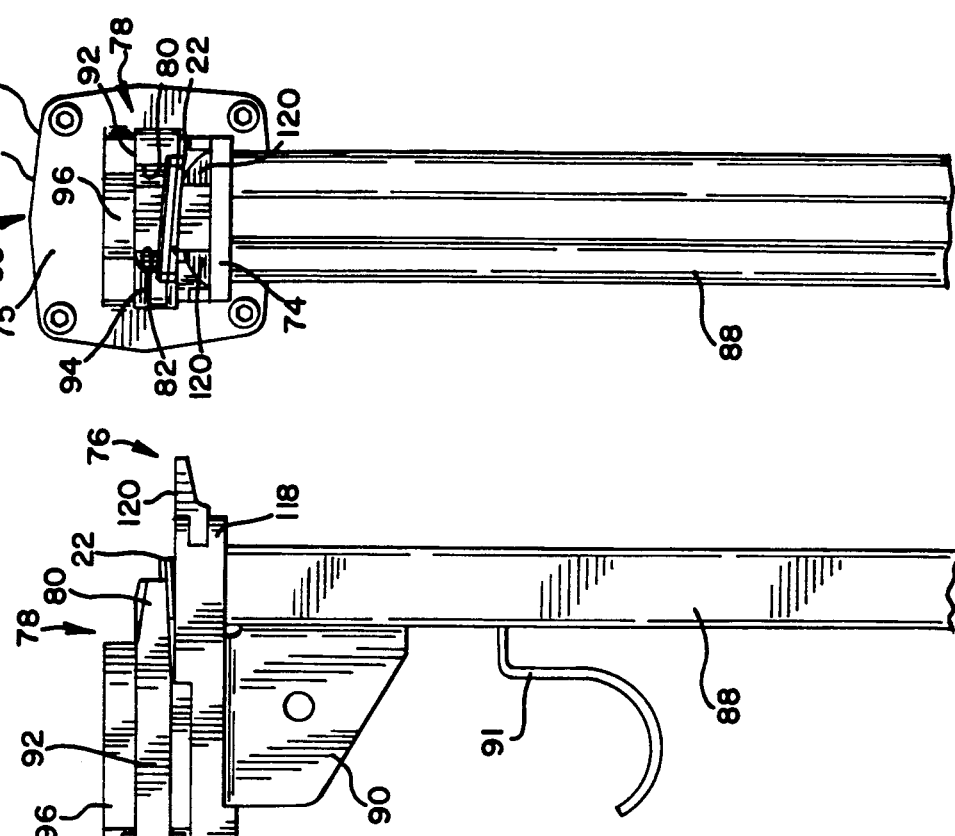
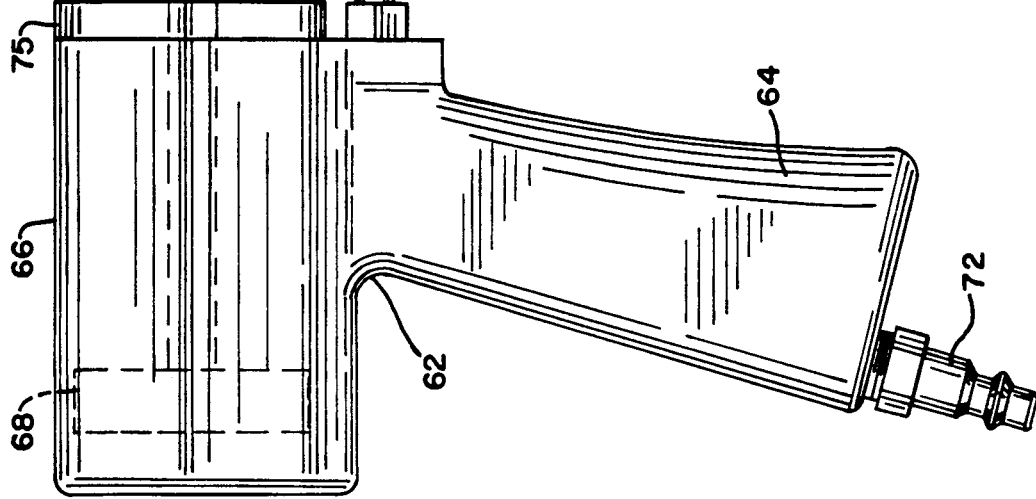

HOG RING FASTENER, TOOL AND METHODS

This is a continuation of application Ser. No. 07/358,254, filed May 30, 1989, now abandoned.

FIELD OF THE INVENTION

The present invention relates to improvements in hog ring fasteners and fastener assemblies, to methods for making hog ring fasteners and fastener assemblies, and to tools and methods for applying hog ring fasteners.

DESCRIPTION OF THE PRIOR ART

Hog Ring Fasteners

Deformable metal fasteners called hog rings are used in numerous different applications for forming a ring or loop around workpieces of various types. For example, hog rings are used in the furniture industry to attach upholstery material to a wire or rod support. One known hog ring fastener is a length of wire formed into a curved, C-shape with pointed, converging legs. The fastener is deformed when applied by a tool to close and cross the legs and form a loop around a workpiece. Known hog ring fasteners are often assembled in strips or sticks and are dispensed in a tool one at a time from a magazine. U.S. Pat. Nos. 2,055,257 and 2,678,443 disclose examples of C-shaped hog ring fasteners.

Hog ring fasteners are designed with a structure or shape that prevents the opposed legs of the fastener from abutting and interfering with one another as the fastener is formed into a loop or ring. This interference is undesirable because it can prevent the desired forming of the fastener into a loop and can cause jamming or wear and damage to a fastener application tool. The most common way to prevent interference between the legs of a hog ring is to provide the opposed legs with points that are offset or oppositely bevelled. An example of this point configuration is found in U.S. Pat. No. 2,174,152, described at page 3, lines 32-44. Another known expedient is to provide an offset in the legs of a C-shaped fastener. An off-set in the legs or points is noted at column 3, lines 29-32 and seen in FIG. 1 of U.S. Pat. No. 2,678,443. Oppositely directed bevelled points and a tool for causing offset of the legs during application are disclosed in U.S. Pat. No. 2,921,315.

A staple is a formed wire fastener having a U-shape with parallel legs each perpendicular to the base or bight. Automated manufacturing and packaging equipment has been developed for economical fabrication and assembly of staples. Despite the cost advantage, staples have not successfully been employed as hog ring fasteners. One reason is that inwardly inclined legs are preferred to parallel legs for application of the fastener. In addition, staples are most economically provided with points by bevelling along planes perpendicular to the plane in which the base and legs of the fastener lie. This type of point, called a "C" point, does not provide an offset preventing interference between the legs when they are formed into a loop or ring. Although staples can be provided with offset points bevelled in the transverse direction, called a "D" point, this requires a more expensive manufacturing method.

In order to take advantage of some of the benefits of staple manufacturing technology, formed wire hog ring fasteners with straight line bases and legs have been provided. A hog ring having this shape is disclosed in U.S. Pat. No. 2,921,315. Like a conventional staple, the legs and base all lie in a common flat plane. Unlike a conventional staple, the legs are not perpendicular to the base, but rather are inclined toward one another in a trapezoid shape. This shape prevents the use of automated packaging and handling equipment used with staples. To prevent interference between the legs of this hog ring fastener as it is formed into a loop, the legs are provided with relatively expensive "D" points.

Methods of Manufacture

Known hog ring fasteners are made by forming wire into the desired shape. Due to expense of forming C-shaped fasteners, many hog ring fasteners are now of the generally trapezoidal type referred to above. These fasteners can be made with equipment and methods similar to those used in the manufacture of some types of staples. However, the cost of manufacture is increased by the necessity for inclining the legs of the fasteners toward one another and the necessity for oppositely directed bevels defining the oppositely oriented "D" points on the ends of the legs. A "D" point cannot be manufactured economically with highly efficient multiwire fabrication equipment.

Many staple fasteners are made in a multiwire process in which numerous wires are fed side by side in a flat plane to bonding, cutoff and forming stations. This is an economical and efficient process for producing staples with a "C" point defined by bevelled surfaces perpendicular to the plane of the fastener. This type of point is formed by pinching off a blank from the flat array of adhered wires prior to forming. The blank is rectangular and the legs are formed by bending the blank to make right angle corners perpendicular to the sides of the blank. Because this manufacturing method has been incapable of providing offsets in the points or legs of the fasteners, it has not been used for the manufacture of hog ring fasteners.

Application Tools and Methods

A known hog ring application tool includes a magazine from which hog rings are introduced one at a time into a pair of application jaws. The jaws hold the hog ring but do not deform it as they are advanced toward the nose of the tool. As the jaws reach the end of their path of movement, they are forced together by a mechanical linkage system to deform the hog ring into a loop in a single stage of deformation. Examples of tools of this type are disclosed in U.S. Pat. Nos. 2,174,152 and 2,678,443. U.S. Pat. No. 2,055,257 discloses a hog ring application tool of this type in which the tool jaws are arranged to cause the legs of the fastener to be bent into an overlapping and offset position.

Reference is made at column 1, beginning at line 29, of U.S. Pat. No. 2,921,315 to an unsatisfactory proposal involving a continuous deformation of a C-shaped hog ring while the jaws advance toward the nose of the tool. The purpose ascribed to this proposal is to tightly hold the fastener with the jaws. This proposal is characterized as objectionable because the full width of the spacing between the legs is not maintained.

SUMMARY OF THE INVENTION

One principal object of the present invention is to provide an improved hog ring fastener with legs lying in parallel planes in order to enjoy the benefits of existing staple making and handling equipment while avoiding the problem of interference between the fastener legs as the fastener is formed into a loop. Other objects are to provide a hog ring fastener that uses inexpensive "C" points and to provide an assembly of hog ring fasteners and a method for making the assembly with multiwire manufacturing equipment. Another object of the present invention is to provide an improved tool and method for applying hog ring fasteners using fasteners with legs in parallel planes and presenting fasteners to a workpiece with the legs inclined toward one another.

In brief, the objects and advantages of one aspect of the present invention are achieved by providing a hog ring fastener that is a length of wire having a central segment defining a base lying in a straight line and a pair of end segments defining legs at opposite ends of the base. The legs lie in spaced apart planes that are parallel to one another and perpendicular to the base. In accordance with the present invention, the legs are angularly offset from one another.

In accordance with another aspect of the present invention, an assembly of hog ring fasteners is an adhered stick of similar hog ring fasteners each being generally of a U-shape and having a base and a pair of legs. The bases lie in a first plane and the legs lie in second and third planes. The second and third planes are parallel to one another and are perpendicular to the first plane In accordance with the present invention, the legs in the first plane are angularly offset from the legs in the second plane.

The present invention also provides a method of making assemblies of hog ring fasteners by advancing numerous wires in parallel side by side relation in a flat planar array and adhering the wires to one another. Blanks are severed from an end of the array, each blank including numerous side by side wire segments of equal length extending parallel to one another in a first direction. The blank is bent along two bending lines to form a U-shaped stick of hog ring fasteners. In accordance with the method of this invention, the severing step includes cutting the wires along a cutting line inclined by a bias angle to a perpendicular to the first direction and the bending lines are parallel to the cutting line.

Another aspect of the present invention relates to a method for applying a generally U-shaped hog ring fastener having a base and two legs lying in planes parallel to one another and perpendicular to the base. The method includes aligning the fastener with a fastener application region and carrying out a first deformation of the fastener after the alignment step to incline the legs of the fastener toward one another while leaving a gap between the ends of the legs. The fastener is advanced to the application region after the first deformation step and the gap is maintained during the advancing step. A second deformation step is carried out at the application region to form the fastener into a loop.

In brief, a hog ring application tool in accordance with the present invention includes a jaw set with a pair of normally open, pivotally mounted jaws. The jaws set is movable in a drive stroke from a rest position to a fastener application region and the jaws are movable relative to one another in a closing movement. Means are provided for introducing a hog ring into the jaws A linkage means is connected between a drive means and the jaw set for moving the jaw set in the drive stroke. Stop means stops the jaw set at the fastener application region at the end of the drive stroke. The linkage means includes means for closing the jaws in response to stopping the jaw set in order to form the hog ring into a loop. Cam means is engaged by the linkage means for forcing the jaws partly closed only during a first portion of the drive stroke to predeform the hog ring and for permitting further movement of the jaw set in the drive stroke while preventing further closing of the jaws.

BRIEF DESCRIPTION OF THE DRAWINGS

The present invention together with the above and other objects and advantages may best be understood from the following detailed description of the embodiment of the invention illustrated in the drawings, wherein:

FIG. 1 is a side elevational view of an assembly of fasteners in accordance with the present invention;

FIG. 2 is a bottom view of the assembly of fasteners of FIG. 1;

FIG. 3 is a front elevational view of a single fastener of the assembly of FIG. 1, taken generally from the line 3—3 of FIG. 1 but taken from a plane parallel to the base of the fastener;

FIG. 4 is a side elevational view of the fastener, taken from the line 4—4 of FIG. 3;

FIG. 5 is a view similar to FIG. 3 illustating the fastener following a first stage of deformation in a method of applying the fastener in accordance with the present invention;

FIG. 6 is a view similar to FIG. 5 illustrating the fastener following the final stage of deformation in a method of applying the fastener in accordance with the present invention;

FIG. 7 is a schematic and diagrammatic view illustrating steps in a method of manufacturing the fastener assembly of FIGS. 1 and 2 in accordance with the present invention;

FIG. 8 is a fragmentary, top plan view illustrating part of the method of manufacturing the fastener assembly;

FIG. 9 is a side elevational view of a hog ring application tool embodying features of the present invention;

FIG. 10 is a front elevational view of the tool of FIG. 9;

DETAILED DESCRIPTION OF THE PREFERRED EMBODIMENT

Figure 11:
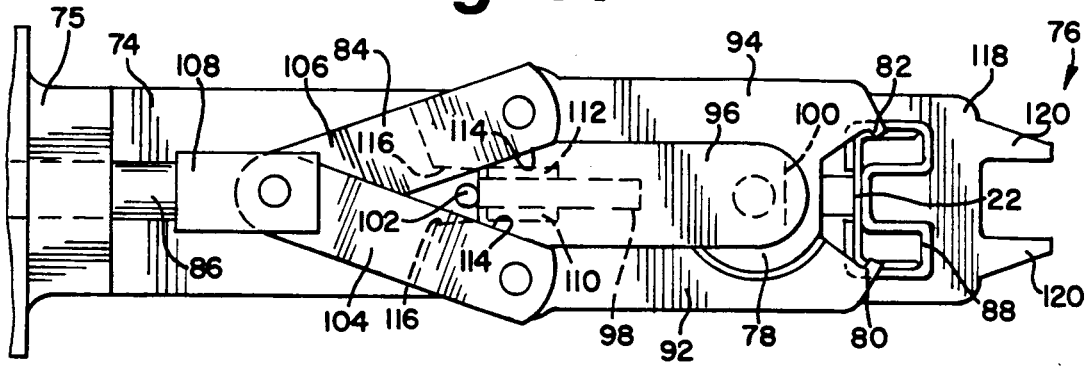
FIG. 11 is a fragmentary top view of the tool of FIG. 9 illustrating the beginning of a hog ring application drive stroke.

In the drawings, FIGS. 1 and 2 illustrate an assembly generally designated as 20 of a series of similar fasteners 22 constructed in accordance with the principles of the present invention. As seen in FIGS. 3 and 4, each fastener 22 is a length of wire formed generally in a U-shape and includes a base 24 and a pair of legs 26 each having an end 28. Fastener 22 is used to form a ring or loop around a workpiece and is the type of a fastener known as a hog ring.

FIGS. 3-6 show how the fastener is deformed during its application into a loop or ring shape. The initial shape of a single fastener 22 is seen in FIG. 3. In this initial shape, the legs 26 lie in planes that are parallel to one another and perpendicular to the base 24. During the method of applying the fastener according to the present invention, the fastener is partially deformed or predeformed in a first stage of deformation as seen in FIG. 5. In this first stage, the base 24 is partly bent or curved or bowed at a central region 30. As a result, the legs 26 are angled slightly toward one another. This inward angle facilitates proper engagement of the fastener 22 with a workpiece.

Following the first stage of deformation, a second and final stage of deformation takes place and the result is seen in FIG. 6. Region 30 is further deformed by bending, curving or bowing. The legs 26 cross or overlap one another at an intersection region 32. A loop or ring 34 is defined by the deformed base 24 including region 30 and by the inner segments of the legs 26.

As the fastener 22 is deformed to make the loop 34, it is important to prevent the ends 28 of the legs 26 from abutting against and interfering with each other. In accordance with the present invention, interference between the ends 28 is avoided in the design of the fastener 22 by an angular offset between the legs 26 seen best in FIG. 4. While the legs 26 lie in parallel planes, the legs 26 are not parallel to one another. Instead, each leg 26 extends from the base 24 at a slightly different angle. The offset angle between the legs 26 is large enough to assure that the end 28 of each leg 26 passes freely across the opposite leg during deformation of the fastener 22. The offset angle is small enough so that when the loop 34 is formed, the legs 26 either contact one another or are close together at the intersection region 32. If the gap or spacing between the legs 26 at intersection 22 is too large, certain types of workpiece material such as fine wires, fabric fibers or the like could escape from the loop 34.

The optimum size of the offset angle depends on the dimensions of the fastener 22 and the wire from which it is made. The presently preferred range of offset angles is from about two degrees to about ten degrees and the presently preferred offset angle is about five degrees.

One aspect of the present invention is a method for making the fastener 22 and the fastener assembly 20. This method is indicated diagrammatically in FIG. 7 and also partially in FIG. 8. Preferably a conventional multiwire staple manufacturing process is modified in accordance with the principles of this invention to make the assembly 20 of fasteners 22.

In this method, a number of individual discrete wires 36 are fed from a source or supply (not shown) in a flat, planar, side-by-side array. The array of wires 36 moves through an application station 38 where an adhesive or binder, usually in liquid form, is applied to the array. Then the adhesive or binder is dried or cured. A drying or curing station 40 is provided for drying or curing the adhesive by the application of heat, air or the like. Depending on the material used, air drying may be employed. At this point in the fabrication method, each wire 36 is adhered to the adjacent wire or wires 36 to form a flat planar web or strip of wires.

A cutoff station including cutoff blades or tools 42 and 44 severs a blank 46 from the end of the adhered wires 36. Instead of the conventional practice in which wires are severed along a line perpendicular to their length, the tools 42 and 44 are arranged at a bias angle 48 (FIG. 8) offset from the perpendicular. This bias angle determines the leg offset angle of each fastener 22. The side edges of the blank 46 are defined by and coincide with the direction or length of the wires 36. The ends of the blank are parallel to one another and are angularly offset from a line perpendicular to the side edges by the bias angle 48. In the conventional multiwire process, a rectangular blank is severed at a cutoff station. In the method of the present invention, the blank is a nonrectangular parallelogram with opposed corners defined alternately by ninety degrees plus and minus the bias angle 48.

Blank 48 is conveyed to a forming station including cooperating forming tools 50 and 52 that are closed over the blank to shape the blank into the fastener assembly 20. In this forming operation, corners 54 of the assembly result where the legs 26 are deformed to extend from the bases 24. After this forming operation, all of the legs 26 are of equal length and are parallel to one another. All of the legs 26 at one side of the assembly 20 lie in a first flat plane, all of the legs at the opposite side of the assembly 20 lie in a second flat plane and all of the bases 24 lie in a third flat plane. The first and second planes are parallel to each other and the first and second planes are perpendicular to the third plane. The corners 54 are somewhat rounded or gradual and constitute right angle corners respectively between the first and third planes and between the second and third planes.

In a conventional multiwire fabrication process, the forming tooling is arranged so that corners are formed lying along lines perpendicular to the directions of the individual wires. In contrast, in accordance with the present invention and as seen in FIG. 8, the tooling is arranged so that the corners extend along lines that are angularly offset from a line perpendicular to the wire direction by the bias angle 48. The tooling edges are parallel to the front and rear edges of the blank 46, and in the assembly 20 the corners 54 are parallel to the fastener ends 28 and all of the legs 26 are of the same length.

Unlike conventional fastener assemblies made by known multiwire fabrication techniques, the assembly 20 does not occupy a rectangular, right cylindrical volume. Instead, the ends of the assembly are canted or biased by the bias angle 48. The angular offset between the side edges of the blank 46 and the forming tools 50 and 52 causes the legs 26 to extend at different angles from the bases 24 to provide each individual fastener 22 with the offset angle seen in FIG. 4. The assembly 20 is generally channel shaped with a longitudinal axis extending along the length of the assembly. Each leg 26 and each base 24 is angularly inclined with respect to this longitudinal axis.

The fastener 22 and assembly 20 have important advantages that are not achieved with known hog ring fasteners. One of these advantages is that they can be economically made with modified conventional multiwire staple making equipment. Moreover, assemblies 20 can be handled and packaged at low cost by existing equipment used for other fasteners. Because the planes of the legs 26 of the assemblies 20 are parallel, the assemblies can be internested in dense and efficient packaging arrays.

Another important advantage is that the ends 28 of the fasteners 22 are provided with a points by the cutoff tools 42 and 44 as the wires 36 are pinched between the tools. Many known hog ring fasteners with parallel or symmetrical legs use oppositely directed "D" points to prevent interference between fastener legs when the fastener is formed into a loop or ring. With this known arrangement, the points on the opposed leg of a single fastener are defined by oppositely beveled planes parallel to the fastener base. Such "D" points cannot be formed by simple cutoff tooling in a multiwire process. As a practical matter, the "D" points must be made by a more expensive process in which one wire at a time is severed and formed by cutoff tooling.

The points of the fasteners 22 are of a different type known as "C" points, and are defined by two intersecting inclined planes running along the length of the leading and trailing edges of the blank 46 and thus running along the length of the formed assembly 20. The bevels lie in planes that are not parallel to the fastener bases 24. Alternatively, if one of the cutoff tools 42 or 44 is blunt instead of sharp, points may be defined by single planes along either the inside or the outside of the fastener legs 26. Using any of the alternative "C" points, forming of the ends 28 into points is accomplished easily and economically during the modified multiwire fabrication process of the present invention simply by pinching off the ends of the wires 36.

Referring now to FIGS. 9 and 10 there is illustrated a hog ring application tool generally designated as 60 and constructed in accordance with the present invention. A housing 62 includes a handle portion 64 and a head portion 66 enclosing a pneumatically operated drive piston 68 normally located at the illustrated standby or rest position. A trigger 70 is depressed by the user to admit pressurized fluid from an inlet fitting 72 to the rear of the piston 68 to operate the tool 60 in a drive stroke for application of one hog ring fastener 22.

Figure 13:
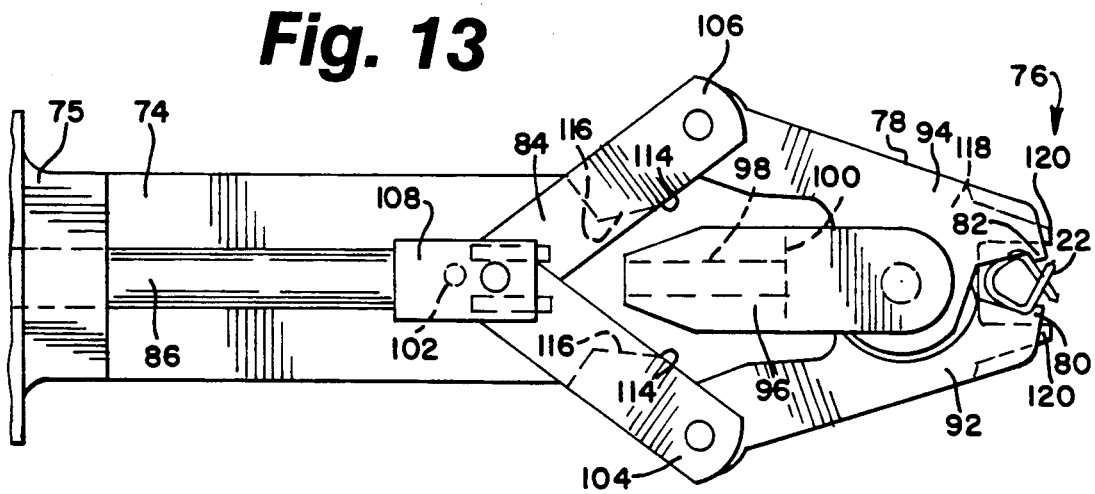
FIG. 13 is a view similar to FIGS. 11 and 12 illustrating the conclusion of a hog ring application drive stroke.

A track member 74 is supported on a front cover 75 of housing 62 and extends forward to a fastener application region 76 where a fastener 22 is applied to a workpiece (not shown). A set 78 of jaws is supported on track member 74 for reciprocal movement between a normal standby or rest position (FIGS. 9-11) and a fastener application position (FIG. 13) at the end of a drive stroke. Jaw set 78 includes a pair of jaws 80 and 82 movable relative to one another between an open position (FIG. 11) and a closed position (FIG. 13). A linkage system 84 coupled by a drive rod 86 between the drive piston 68 and the jaw set 78 serves to advance the jaw set and close the jaws 80 and 82.

Fasteners 22 are supplied one at a time from a fastener assembly 20 contained in a magazine 88 mounted on the front portion of the track member 74 by a bracket 90. Magazine 88 is of conventional construction and includes a spring loaded pusher 91 urging fasteners 22 upwardly with the lead fastener 22 in position to be picked off and gripped by the jaw set 78 as it is driven from its standby position. As best seen in FIG. 10, the undersides of jaws 80 and 82 are offset and inclined to register with the angularly offset orientation of fasteners 22 in the assembly 20. The jaws grip a fastener 22 in the region of the corners 54, and the jaws are at different elevations relative to the track member 74 to properly engage the fastener. This inclined or offset fastener position is maintained throughout the drive stroke.

Jaws 80 and 82 are formed at the front ends of a pair of jaw levers 92 and 94 pivoted intermediate their ends by a pin projecting below a reciprocal shuttle block 96. Block 96 includes a downwardly projecting runner 98 that slides in a track (not shown) in track member 74 between a forward stop position defined by a surface 100 and a rear stop provided by a screw 102 that captures the shuttle block upon the track member 74.

Linkage system 84 includes two links 104 and 106 pivoted to the rear ends of the jaw levers 92 and 94. The rear ends of links 104 and 106 are pivoted in common to a drive fitting 108 attached to the front end of drive rod 86.

Figure 12:
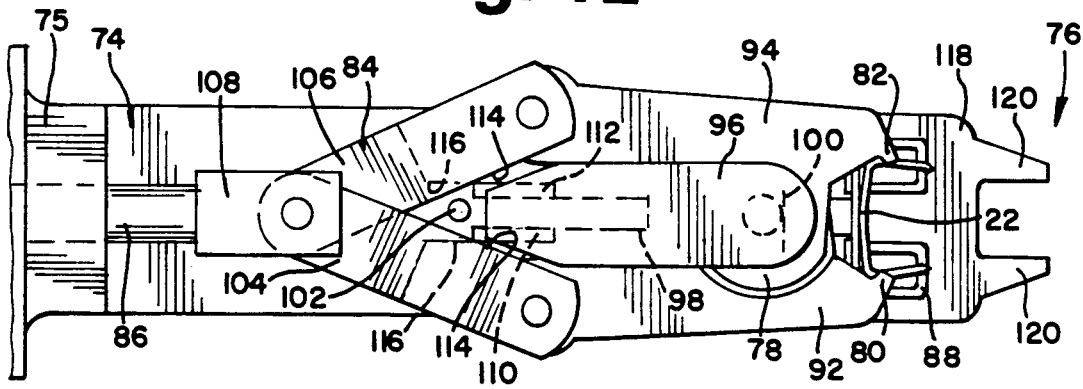
FIG. 12 is a view similar to FIG. 11 illustrating an intermediate part of a hog ring application drive stroke.

In accordance with a feature of the present invention, during a drive stroke the fastener 22 is deformed in two distinct and discrete deformation stages. The first stage occurs in the first part of the drive stroke as the fastener is predeformed as seen in FIG. 12 and FIG. 5 so that its legs are inwardly inclined but separated by a gap. This shape is optimum for application of the fastener to a workpiece, and is maintained without further deformation as the fastener is advanced through the rest of the drive stroke to the fastener application region.

A pair of cam members 110 and 112 are defined on the track member 74, one to each side of the path of the runner 98. During the initial part of a drive stroke, these cam members are contacted by cam follower surfaces 114 on links 104 and 106. Surfaces 104 and 106 lead to relief surfaces 116 provided on the undersides of the links 104 and 106 in order to limit the predeformation of the fastener 22 to a brief and discrete part of the drive stroke.

Tool 60 includes a nose portion 118 with a pair of guide fingers 120 extending into the fastener application region 76. The fingers 120 are useful for gathering or positioning or holding a workpiece or for positioning the tool 60 relative to a workpiece.

In operation, the tool 60 is initially in a standby or rest position with the drive piston 68 retracted as seen in FIG. 9. An assembly 20 of fasteners 22 is loaded into the magazine 88 and the endmost fastener 22 is urged by pusher 91 into a drive position (FIG. 10) in registration with the jaws 80 and 82. A supply of pressurized air is introduced to the housing 62 through the fitting 72.

To begin a fastener applying operation, trigger 70 is operated to move the piston 68, drive rod 86 and drive fitting 108 in the forward direction in a drive stroke. The linkage system 84 pushes the jaw set 78 forward and the jaw set 78 pushes the shuttle block 96 forward. At the beginning of the drive stroke, the jaws 80 and 82 pick a single fastener 22 off of the assembly 20 carried by the magazine 88. The tendency of the diverging links 104 and 106 is to move the jaws 80 and 82 to their closed position. However, the closing force is overcome by the mechanical resistance of the fastener 22 to deformation and the closing force serves to grip the fastener 22 securely without deforming it.

Early in the first part of the drive stroke, the cam follower surfaces 114 on links 104 and 106 engage the cam abutments 110 and 112. As a result the links 104 and 106 are forced apart from the position seen in FIG. 11 to the position seen in FIG. 12. Consequently, the jaws 80 and 82 are forced together to a partially closed position. This partial closing causes a first stage of fastener deformation as the fastener 22 is predeformed and its legs are inwardly inclined to the preferred fastener applying position.

The first stage of deformation ends when the cam follower surfaces 114 pass the abutments 110 and 112 and the abutments 110 and 112 enter relief regions resulting from the provision of relief surfaces 116. When this occurs, no further outward force is applied by the abutments 110 and 112 to the links 104 and 106 and both closing of the jaws 80 and 82 and deformation of the fastener 22 is discontinued. As the drive stroke continues, the gap between the fastener legs is maintained as the jaw set 78 is advanced into the fastener application region 76.

As the jaw set 78 and shuttle block 96 reach the end of the drive stroke, the runner 98 stops against the stop surface 100 as seen in FIG. 13. The drive piston 68, drive rod 86 and drive fitting 108 continue moving forward. As a result, the links 104 and 106 are pivoted further apart and the jaws are forced to their closed position. The fastener 22 is formed into a loop or ring around the workpiece in the region between the guide fingers 120. Following the drive stroke, pressure is relieved at the rear of the drive piston 68 and the tool is returned to its standby position ready to apply another fastener.

While the invention has been described with reference to the embodiment shown in the drawings, the details are not intended to limit the scope of the invention as defined in the following claims.

We claim:

1. A method for making an assembly of hog ring fasteners and for applying a fastener of the assembly to a workpiece, said method comprising the steps of:

advancing numerous wires in parallel side by side relation in a flat planar array;

adhering said wires to one another in said array;

severing blanks from an end of said array, each blank including numerous side by side wire segments of equal length extending parallel to one another in a first direction; and bending said blank to form substantially 90 degree corners along two bending lines to form a U-shaped stick of adhered hog ring fasteners each having a base and two legs;

said severing step including cutting the wires along a cutting line inclined by a bias angle to a perpendicular to said first direction;

said bending lines being parallel to said cutting line and said legs of each hog ring fasteners being offset from one another;

removing a fastener from the stick of fasteners; and deforming the base of the removed fastener to form the fastener into a loop around a workpiece by moving the legs of the fastener into proximity with one another.

2. The method of claim 1 wherein said severing step is performed by pinching off said wires to form points.

3. The method of claim 1 wherein said bias angle is about five degrees.

4. The method of claim 1 wherein said deforming step includes a first deforming phase wherein the fastener legs are inclined toward one another with the fastener spaced from the workpiece and a second deforming phase wherein the fastener legs are crossed with the fastener around the workpiece.

5. A method of making and applying a hog ring fastener to a workpiece comprising the steps of:

bending a length of straight wire at two spaced apart regions to form a fastener base and a pair of fastener legs lying in planes generally parallel to one another and extending from opposite ends of the base at about 90 degrees to the base;

said bending step including maintaining the wire straight except at corners where the legs join the base and offsetting the legs at an offset angle relative to one another;

positioning the fastener partly around a workpiece; and deforming the base of the fastener to loop the fastener around the workpiece by moving the legs of the fastener into proximity with one another.

6. A method as claimed in claim 5 in which said offset angle is between two and ten degrees.

7. A method as claimed in claim 5 in which said offset angle is about five degrees.

8. A method as claimed in claim 5 wherein said deforming step includes two distinct deforming phases in which the fastener legs are first inclined toward one another and then are crossed to complete a loop.

9. A method as claimed in claim 5 further comprising pinching the ends of the legs to make points defined by bevelled surfaces lying in planes nonparallel to the base.

* * * * *